Nov. 6, 1962 H. H. HOWARD ET AL 3,062,377
FILTRATION EQUIPMENT
Filed July 7, 1959
FIG. 1.
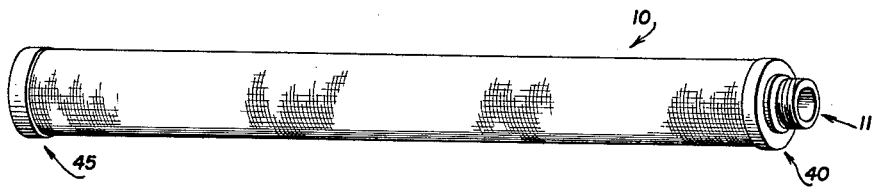
FIG. 2.
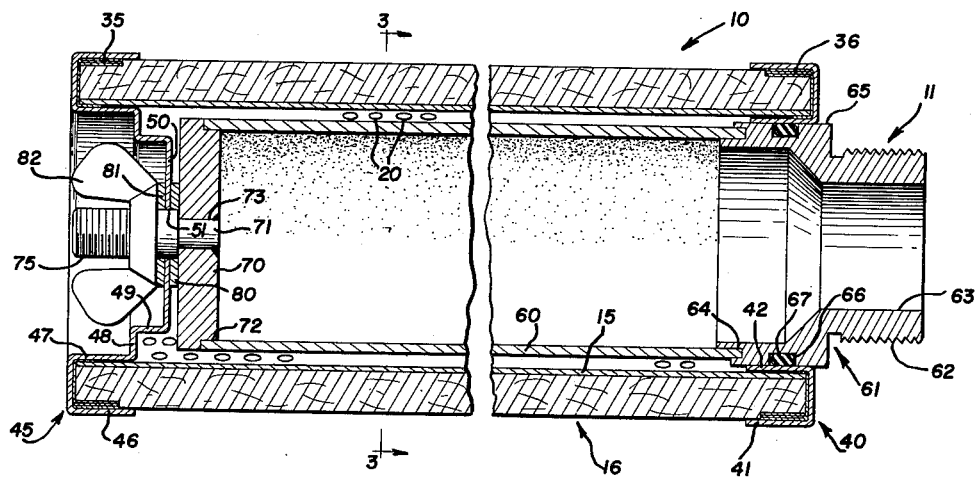
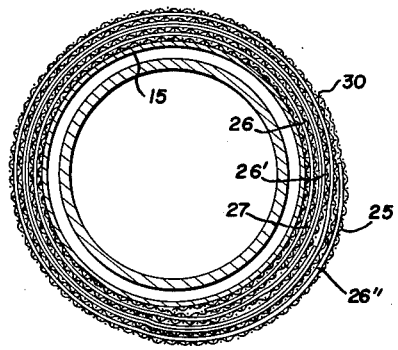
FIG. 3.
INVENTORS
Herbert H. Howard
BY Paul A. Smith
Robert A. Lubben
Arthur Middleton
ATTORNEY United States Patent Office 3,062,377
Patented Nov. 6, 1962

3,062,377
FILTRATION EQUIPMENT
Herbert H. Howard, Los Angeles, Paul A. Smith, Tarzana, and Robert A. Lubben, Hollywood, Calif., assignors to Permanent Filter Corporation, Los Angeles, Calif., a corporation of California
Filed July 7, 1959, Ser. No. 825,513
8 Claims. (Cl. 210—315)

The present invention relates to new and novel filtration equipment and more particularly to a filter unit which is especially adapted to separate water from filtered fluids.

The unit according to the present invention may be employed for removing undesired contaminants from various fluids, but the invention is particularly adapted for removing contaminants from non-water-soluble hydro carbon fuels which are employed for example in jet aircraft and missiles. In such applications, the removal of contaminants is a critical factor, and accordingly, the present invention is adapted to provide a high degree of removal of the contaminants of such fluids.

In order to satisfactorily filter hydro carbon fuels and the like, it is necessary not only to remove the solid contaminants from the fluid, but also to separate out the finely suspended particles of water. The necessity for stripping the water from the fuel is well-recognized since the presence of even relatively small amounts of water in fuel employed in jet aircraft and missiles is very dangerous since it often causes malfunctioning of the engines which results in serious consequences.

The problem of removing suspended water from such fuels has long been recognized in the art, and various combinations of filter media have been proposed, but none of the known arrangements have provided the desired results. The present invention employs a novel arrangement wherein the filtered fluid is first passed through a porous rigid hydrophobic matrix having certain characteristics, and thence through a plurality of layers of fibrous material, this particular combination of filter elements providing new and unobvious results.

The drops of water suspended in the fuel are often formed around a dirt particle as a nucleus, while others of the drops are not. These water drops or droplets often have a charge of static electricity, the drops having the same polarity repelling each other thereby resisting coalescing such that the water drops can be readily removed. In passing through the porous matrix of the present invention, it has been found that the static electrical charges on these water particles are removed or neutralized such that the particles or drops become what may be termed docile or charge-free whereby they may be readily coalesced or depeptized.

The matrix also serves to remove solid contaminant particles of a certain size. The plurality of layers of fiberglass serve the double function of holding back solid contaminants as well as producing a coalescing of the water droplets such that when the filtered fluid passes downstream of the fiberglass layers, the water drops are of sufficient size to be readily removed from the filtered fluid under the action of gravity.

An important feature of the present invention is the manner of assembly of the various filter elements. The porous matrix filter means comprises a first unit which is supported within and is readily mountable and demountable with respect to the coalescer means which forms a second self-contained unit. In this manner, the porous filter means and the coalescer means may be separately manufactured and subsequently assembled in operative position so as to provide a compact assembly which will perform the desired filtering function.

The coalescer means includes a plurality of layers of fiberglass which are wrapped around a relatively rigid perforated cylindrical member, the layers of fiberglass being secured in assembled relationship by means of a suitable foraminous material. End caps are mounted at opposite ends of the coalescer means and serve as a means for supporting the porous filter means in operative position within the coalescer means. The porous filter means includes a substantially cylindrical porous filter means formed of substantially spherical members bonded to one another. An attaching fitting is secured at one end of the porous cylinder and is slidably received within one of the end caps mounted on the coalescer means. A mounting means is secured to the opposite end portion of the porous cylinder and is removably clamped to the other end cap such that the porous filter means may be easily locked in operative position, and also may be readily removed when it is desired to clean or replace either the coalescer means or the porous filter means.

An object of the present invention is to provide a new and novel filter unit which is particularly adapted not only to remove solid contaminants, but also to serve as an effective coalescing means for promoting water droplet growth.

Another object is the provision of a filter unit including a central porous filter unit and a concentric surrounding coalescing unit spaced from the porous filter unit.

A further object of the invention is to provide a filter assembly including a pair of units which may be readily assembled and disassembled with respect to one another.

A still further object of the invention is to provide a filter assembly which provides a compact and sturdy structure, and yet which is quite simple and inexpensive in construction.

Other objects and many attendant advantages of the invention will become more apparent when considered in connection with the specification and accompanying drawing, wherein:

FIG. 1 is a perspective view of a filter assembly according to the present invention;

FIG. 2 is a longitudinal section through the assembly shown in FIG. 1; and

FIG. 3 is a sectional view taken along line 3—3 of FIG. 2 looking in the direction of the arrows.

Referring now to the drawing wherein like reference characters designate corresponding parts throughout the several views, the overall filter assembly is indicated generally by reference numeral 10, this filter assembly being adapted to be mounted as a unit within a suitable supporting structure such as a header or the like mounted in a large filter tank, the assembly according to the present invention serving as one of the filter stages of an overall filter system. It is apparent that the assembly of the present invention is adapted to be screwed into suitable openings in the header by means of a threaded end portion 11, whereby the assembly may be readily mounted and dismounted with respect to its supporting structure. As seen especially in FIGS. 2 and 3, the outer coalescer unit includes an inner substantially cylindrical member 15 surrounded by a plurality of layers of fibrous material indicated generally by reference numeral 16, and a pair of end caps 40 and 45 mounted at the opposite ends of the unit. The construction of the coalescer unit according to the present invention is identical with that disclosed in my copending application, Ser. No. 825,514, filed July 7, 1959, relating to the novel method of manufacturing the coalescer unit.

The inner cylindrical member of the coalescer unit is formed of a relatively rigid material such as brass and is provided with a plurality of equally spaced perforations 20 formed therethrough. As seen especially in FIG. 3 of the drawing, a strip of foraminous material 25 preferably in the form of insect screening and comprising plastic or the like material is wrapped about the cylinder in a spiral manner such that it is interposed between the various layers of fiberglass. The completed structure includes an inner layer 26 of fiberglass. This inner layer is formed of fiberglass wool such as manufactured under the name of "Fiberglas" by the Owens-Corning Glass Company, layer 26 being constructed of unbonded "B" fibers having an average diameter of .00010 to .00015 inch.

Radially outwardly of the first layer 26 is disposed a double layer 26', 27, these layers being in abutting relationship with one another. Layer 26' is formed of "B" fibers and is actually a continuation of layer 26 while layer 27 is formed of fiberglass wool and comprises unbonded "AA" fibers having an average diameter of .00003 to .00004 inch.

Disposed radially outwardly of the double intermediate layer is a single layer of fiberglass 26" formed of "B" fibers, layer 26" being a further extension of layer 26, 26'.

It is accordingly apparent that there is provided a completed structure including an inner layer of "B" fibers which serve a drop-size propagating function, an intermediate double layer including "A" fibers which serve as a barrier to fine drops, and an outermost layer of "B" fibers which serve a further drop-size propagating function. The overall assembly is retained in operative position by sealing the foraminous material to itself along a longitudinally extending seam indicated at 30, this seam being formed as by passing a heating gun along the seam to heat-seal the foraminous material to the underlying portion thereof.

The opposite end portions of the coalescer means are sealed by a suitable liquid adhesive and an additional sealing means in the form of adhesive plastic tape indicated at 35 and 36 which is wrapped around the layers of fiberglass and extends down the outside thereof as well as the inside thereof.

A first end cap is indicated generally by reference numeral 40 and is provided with a substantially U-shaped cross-section as seen in FIG. 2, the opposite legs 41 and 42 of the cap being concentric with one another and extending around the outer surface of the coalescer means and around the inner face of the coalescer means respectively. End cap 40 is bonded and secured in operative position relative to the end portion of the coalescer means by heat-curing of plastic ribbon 36 which serves to maintain the end cap in operative position.

Disposed at the opposite end of the coalescer means is a second end cap 45, this end cap including legs 46 and 47 which are concentric with one another and which extend along the outer surface of the coalescer means and the inner surface thereof respectively. Leg 47 is connected integrally with an annular portion 48 from which extends a leg 49 extending normally to flange 48. Leg 49 in turn is formed integrally with a flat wall portion 50 having a central opening 51 formed therethrough. End cap 45 is secured to the end of the coalescer means by bonding the adhesive ribbon 35 thereto by heat-curing or the like. Each of end caps 40 and 45 are preferably formed of a relatively rigid material such as brass or the like. The above-described structure comprises the coalescer unit of the present invention, the hereinafter described porous filter unit being supported within the coalescer unit by mounting the porous filter unit within the end caps of the coalescer unit.

The porous filter unit includes a substantially cylindrical porous filter member 60 which is formed of a plurality of substantially spherical metallic members which are bonded to one another. A preferred form of matrix is one wherein the spheres thereof are formed of bronze and are sintered to one another. These spheres may, for example, be formed of about 90 percent copper with a 10 percent coating of tin thereon, the spheres being sintered to one another in a well-known manner. The completed relatively rigid cylinder has a staple which is axial while its flow-through is approximately 90 degrees. The matrix may be approximately 1/8 inch to 3/16 inch thick, and the average void space is about 40 percent of the area. The pores or passages through the matrix preferably lie in the range of about 10 to 40 microns. Where the matrix is to be used for holding back about 98 percent of all particles 10 microns in size and larger, the sintered spheres may be sized as follows: 2 percent maximum having a diameter of plus 60 screen mesh; 55–85 percent plus 80 screen mesh; 10–35 percent plus 100 screen mesh; and 10 percent maximum plus 150 screen mesh with the starting spheres being about 90 percent copper with a tin coating of about 10 percent. The "plus" in the foregoing designates particles that will remain on the given sieve size.

An attaching fitting indicated generally by reference numeral 61 is mounted at one end of the porous cylinder 60. Fitting 61 is formed of a suitable, relatively rigid material such as brass and is provided with an outer thread 62 thereon which as described previously serves to enable the assembly to be readily mounted within a header plate. A central bore 63 is formed through the fitting whereby fluid may readily pass through the central portion thereof, and a groove 64 is formed in the inner end thereof within which one end portion of the porus cylinder 60 is seated. Cylinder 60 is suitably secured within the groove 64 as by silver brazing or the like.

An outer cylinderical surface 65 is provided on the attaching fitting which fits snugly within the central opening defined by leg 42 and end cap 40 whereby the porus filter unit may be slid into operative position as shown in FIG. 2. A peripheral groove 66 is provided in surface 65 and a conventional O-ring seal 67 formed of rubber or the like is seated within groove 66. It is apparent that when the attaching fitting is disposed in operative position as shown, the O-ring 67 serves to provide a fluid-tight seal between the attaching fitting and end cap 40.

A mounting means is secured to the opposite end of porous cylinder 60, the mounting means including a plate 70 having a stud 71 secured thereto. Plate 70 is provided with a peripheral groove 72 which receives the adjacent end portion of porous cylinder 60, cylinder 60 being secured to plate 70 as by silver brazing or the like. Stud 71 includes an enlarged portion 75, the outer end of which is threaded, the inner end of the enlarged portion 75 being smooth and fitting snugly within the opening 51 in wall 50 of end cap 45.

A gasket 80 is mounted between the outer surface of plate 70 and the adjacent surface of wall' 50 of the end cap to provide a fluid seal therebetween, gasket 80 being formed of rubber or similar material.

A conventional disc-shaped washer 81 is disposed about the smooth inner end of enlarged portion 75 of the stud 71 and is interposed between wall 50 and the inner surface of a wing nut 82, wing nut 82 being threaded on the outer threaded end of stud 71.

It is apparent that when the porus filter unit is disposed in operative position as shown in FIG. 2, the smooth portion of the enlarged outer end of stud 71 and the cylindrical surface 65 of attaching fitting 61 are snugly received within the end caps 45 and 40 respectively. Washer 80 and O-ring 67 serve to provide fluid-tight seals with the respective end caps, and wingnut 82 secures the porous filter unit in operative position.

It is evident that when it is desired to disassemble the coalescer unit and the porous filter unit, the wing nut is unthreaded from stud 71, whereupon the filter unit is adapted to slide out of the coalescer unit. This permits either the coalescer unit or the porus filter unit to be cleaned or replaced as desired. It is also apparent that the porous filter unit can be readily inserted within the coalescer unit by sliding the porus filter unit into operative position as shown and then threading the wing nut 82 into clamping position.

It is apparent from the foregoing that there is provided a new and novel filter unit which is adapted not only to effectively remove solid contaminants, but also to serve as an effective water-stripping device. The assembly according to the present invention includes a porus filter unit and a concentric spaced surrounding coalescer unit, each of these units being readily assembled and disassembled with respect to one another. The overall arrangement provides a very compact and sturdy structure and yet the device is quite simple and inexpensive in construction.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Filtration equipment comprising an alongated hollow coalescer means including a plurality of layers of fiberglass, the innermost and outermost layers being formed of coarser fibers than the fibers of the intermediate layer of the coalescer means, end cap means supported at each end of said coalescer means, an elongated hollow porous filter means comprising a plurality of substantially spherical metallic members bonded to one another, said porous filter means being supported by said end cap means within said coalescer means and spaced therefrom, and means for supplying fluid to be filtered to the interior of said hollow porous filter means.

2. Filtration equipment comprising a hollow coalescer means including a plurality of layers of fibrous material, the innermost and outermost layers being formed of coarser fibers than the fibers of an intermediate layer of the coalescer means, means for sealing one end of said coalescer means, a hollow porous filter matrix supported within said coalescer means and spaced therefrom, and means including the other end of said coalescer means for supplying fluid to be filtered to the interior of said hollow porous filter matrix.

3. The apparatus defined in claim 2 wherein said plurality of layers are each formed of fiberglass.

4. The apparatus defined in claim 2 wherein said hollow porous filter matrix comprises a plurality of bronze spheres which are bonded to one another by sintering and are of a diameter such as to provide passages through the matrix within the range of from ten to forty microns.

5. Filtration equipment including an elongated hollow coalescer means including a plurality of layers of fibrous material, a first relatively rigid end cap mounted on one end of said coalescer means, a second relatively rigid end cap mounted on the opposite end of said coalescer means, each of said end caps defining a central opening formed therethrough, a porous filter means including a substantially cylindrical wall portion formed of sintered metallic spheres, said cylindrical wall being spaced from the inner wall of said coalescer means, an attaching fitting formed at one end of said porous filter means, said attaching fitting being received snugly within said first end cap, means sealing said attaching fitting with respect to said first end cap, a support member formed at the opposite end of the porous filter means and being snugly received within the opening in said second end cap, and removable clamping means securing said opposite end of the porous filter means to said second end cap.

6. Apparatus as defined in claim 5, wherein said support member is threaded, said clamping member being threadedly mounted upon the threaded portion of the support member and engaging said second end cap for locking said opposite end portion of the porous filter means to said second end cap, said first-mentioned end portion of the porous filter means being slidably received within said first end cap.

7. Filtration equipment comprising an elongated hollow coalescer means including an inner relatively rigid perforated cylindrical member, a plurality of layers of fiberglass disposed in surrounding relationship to said cylindrical member, means securing said layers of fibreglass in operative position, a first end cap mounted at one end of said coalescer means, a second end cap mounted at the opposite end portion of said coalescer means, each of said end caps defining a central opening formed therethrough, porous filter means supported within said coalescer means and being spaced therefrom, said porous filter means including a substantially cylindrical central portion formed of sintered bronze spheres, an attaching fitting secured to one end portion of said central portion and being slidably received within the opening defined by said first end cap, sealing means sealing said attaching fitting with respect to said first end cap, a support means mounted at the opposite end of said central portion, said support means including a threaded stud extending longitudinally of the porous filter means, and a clamping member threadedly mounted on said threaded stud for clamping the porous filter means in operative position.

8. Apparatus as defined in claim 7, wherein said plurality of layers of fiberglass includes at least three layers of different coarseness, an intermediate layer being of less coarseness than the layers upstream and downstream thereof.

References Cited in the file of this patent

UNITED STATES PATENTS

| | | |
|---|---|---|
| 1,601,502 | Munro | Sept. 28, 1926 |
| 2,359,386 | Reinsch | Oct. 3, 1944 |
| 2,562,730 | Miller | July 31, 1951 |
| 2,598,818 | Muirhead | June 3, 1952 |
| 2,732,077 | Robinson | Jan. 24, 1956 |
| 2,911,101 | Robinson | Nov. 3, 1959 |

Disclaimer 3,062,377.—*Herbert H. Howard*, Los Angeles, *Paul A. Smith*, Tarzana, and *Robert A. Lubben*, Hollywood, Calif. FILTRATION EQUIPMENT. Patent dated Nov. 6, 1962. Disclaimer filed Apr. 18, 1975, by the assignee, *Permanent Filter Corporation*.

Hereby disclaims the entire remaining term of said patent.

[*Official Gazette September 2, 1975.*]